United States Patent
Ma et al.

(10) Patent No.: US 10,254,157 B2
(45) Date of Patent: Apr. 9, 2019

(54) ASYMMETRIC OPTICAL RESONATOR AND OPTICAL DEVICE COMPRISING THE ASYMMETRIC OPTICAL RESONATOR

(71) Applicant: Leibniz-Institut für Festkörper- und Werkstoffforschung Dresden e.V., Dresden (DE)

(72) Inventors: Libo Ma, Dresden (DE); Oliver G. Schmidt, Dresden (DE)

(73) Assignee: Leibniz-Institut für Festkörper-und Werkstoffforschung Dresden e.V., Dresden (DE)

( * ) Notice: Subject to any disclaimer, the term of this patent is extended or adjusted under 35 U.S.C. 154(b) by 241 days.

(21) Appl. No.: 15/423,297

(22) Filed: Feb. 2, 2017

(65) Prior Publication Data

US 2017/0219427 A1   Aug. 3, 2017

(30) Foreign Application Priority Data

Feb. 2, 2016   (DE) .................... 10 2016 101 813

(51) Int. Cl.
| | |
|---|---|
| H01J 40/14 | (2006.01) |
| G01J 1/04 | (2006.01) |
| G02B 6/122 | (2006.01) |
| G02B 6/12 | (2006.01) |

(52) U.S. Cl.
CPC .......... *G01J 1/0407* (2013.01); *G02B 6/1228* (2013.01); *G02B 2006/12138* (2013.01); *G02B 2006/12159* (2013.01)

(58) Field of Classification Search
CPC .... G01J 1/0407; G01J 1/0425; G02B 6/1223; G02B 6/1228; G02B 6/26

USPC ..................... 250/227.11, 227.14; 385/27, 50
See application file for complete search history.

(56) References Cited

U.S. PATENT DOCUMENTS

| | | | | |
|---|---|---|---|---|
| 6,583,399 B1 * | 6/2003 | Hunziker | ........... | G01N 21/7746 250/214 R |
| 6,633,696 B1 * | 10/2003 | Vahala | ................... | B82Y 20/00 385/1 |
| 2006/0072875 A1 | 4/2006 | Bhagavatula et al. | | |
| 2009/0310140 A1 | 12/2009 | Smith et al. | | |
| 2013/0176557 A1 | 7/2013 | Sumetsky | | |

FOREIGN PATENT DOCUMENTS

DE   112012000685 T5   11/2013

OTHER PUBLICATIONS

Bliokh, K.Y., et al., "Geometrodynamics of Spinning Light," Nature Photonics, vol. 2, pp. 748-753 (Dec. 2008).

(Continued)

*Primary Examiner* — Kevin Pyo
(74) *Attorney, Agent, or Firm* — Edell, Shapiro & Finnan, LLC

(57) ABSTRACT

An asymmetric optical resonator comprises a waveguiding element forming a closed loop. A first circumference of the loop is different from a second circumference, the first circumference being measured at one end of the loop in a plane perpendicular to a cavity axis. The second circumference is measured at the opposite end of the loop in a plane perpendicular to the cavity axis. An effective refractive index of the waveguiding element varies along a circumferential direction of the loop.

15 Claims, 8 Drawing Sheets

(56) References Cited

OTHER PUBLICATIONS

Chiao, R.Y., et al., "Observation of a Topological Phase by Means of a Nonplanar Mach-Zehnder Interferometer," Physical Review Letters, vol. 60(13):1214-1219 (Mar. 1988).

Tang, Y., and A.E. Cohen, "Enhanced Enantioselectivity in Excitation of Chiral Molecules by Superchiral Light," Science, vol. 332 (6027), pp. 333-336 (Apr. 2011).

* cited by examiner

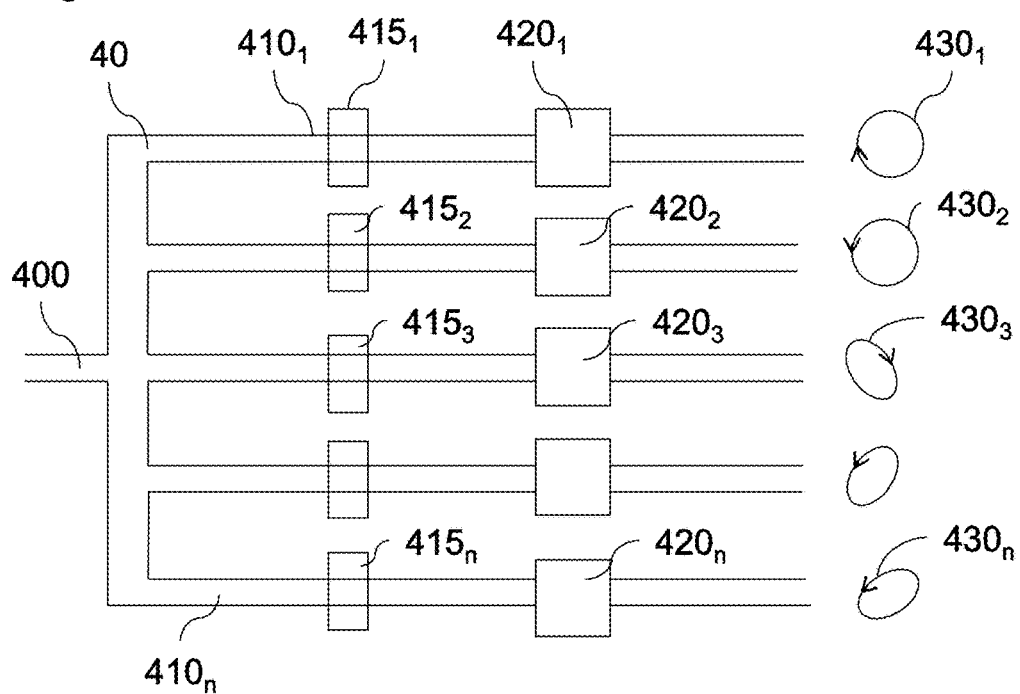

US 10,254,157 B2

ASYMMETRIC OPTICAL RESONATOR AND OPTICAL DEVICE COMPRISING THE ASYMMETRIC OPTICAL RESONATOR

CROSS REFERENCE TO RELATED APPLICATIONS

This application claims foreign priority under 35 U.S.C. § 119(a)-(d) to Application No. DE 102016101813.9 filed on Feb. 2, 2016, the entire contents of which are hereby incorporated by reference.

FIELD OF THE INVENTION

The present specification relates to an asymmetric optical resonator comprising a waveguiding element forming a closed loop.

BACKGROUND

Optical components which utilize or change a polarization state of light are widely used in a variety of applications, including inter alia communication systems, image generation systems, image display systems, and sensor devices. In more detail, devices for converting a linearly polarized light into circularly or elliptically polarized light are being investigated. Conventionally, $\lambda/4$ plates may be used for converting linearly polarized light into circularly polarized light and vice versa.

It is desirable to develop an improved optical resonator which is capable of converting the polarization state of light, which may be miniaturized to a large degree and which may be mounted on a substrate or integrated on a chip.

SUMMARY

According to embodiments, an asymmetric optical resonator comprises a waveguiding element forming a closed loop. A first circumference of the loop is different from a second circumference, the first circumference being measured at one end of the loop in a plane perpendicular to a cavity axis, the second circumference being measured at the opposite end of the loop in a plane perpendicular to the cavity axis. An effective refractive index of the waveguiding element varies along a circumferential direction of the loop.

According to further embodiments, an optical device comprises an asymmetric optical resonator and a waveguide configured to couple light to the asymmetric optical resonator. The asymmetric optical resonator comprises a waveguiding element forming a closed loop. A first circumference of the loop is different from a second circumference, the first circumference being measured at one end of the loop in a plane perpendicular to a cavity axis, the second circumference being measured at the opposite end of the loop in a plane perpendicular to the cavity axis. An effective refractive index of the waveguiding element varies along a circumferential direction of the loop.

According to still further embodiments, an optical sensor comprises an asymmetric optical resonator. The asymmetric optical resonator comprises a waveguiding element forming a closed loop. A first circumference of the loop is different from a second circumference, the first circumference being measured at one end of the loop in a plane perpendicular to a cavity axis, the second circumference being measured at the opposite end of the loop in a plane perpendicular to the cavity axis. An effective refractive index of the waveguiding element varies along a circumferential direction of the loop.

The optical sensor further comprises an analyzer for analyzing a transmission spectrum of the asymmetric optical resonator.

Those skilled in the art will recognize additional features and advantageous upon reading the following detailed description and on viewing the accompanying drawings.

BRIEF DESCRIPTION OF THE DRAWINGS

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

FIG. 5 shows a schematic view of an optical communication device.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Figure 1A:
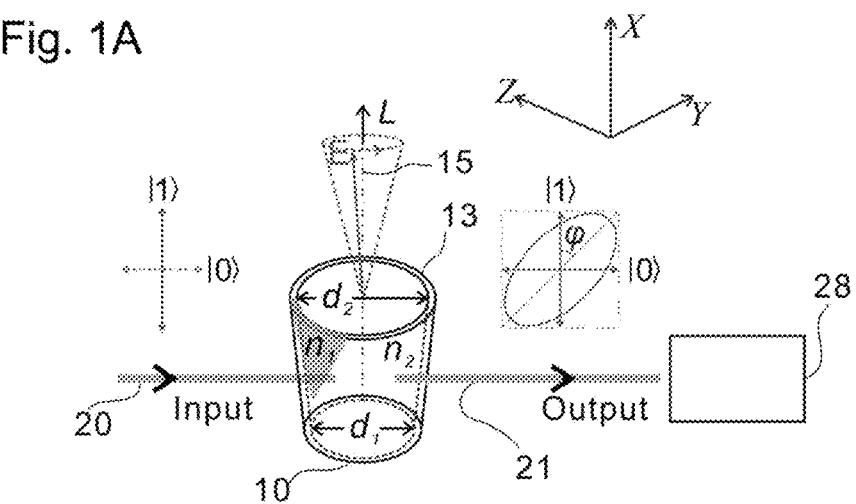
FIG. 1A shows a schematic view of an optical device comprising an asymmetric optical resonator according to an embodiment.

FIG. 1A is a schematic view of an asymmetric optical resonator 10 according to an embodiment. The asymmetric optical resonator 10 shown in FIG. 1A comprises a waveguiding element 13 which forms a closed loop. A first circumference of the loop is different from a second circumference. The first circumference is measured at one end of the loop in a plane perpendicular to a cavity axis 15. For example, the cavity axis 15 runs in a first direction, e.g. the x direction. The cavity axis 15 is enclosed by the loop. The second circumference is measured at the opposite end of the loop in a plane perpendicular to the cavity axis 15. An effective refractive index of the waveguiding element varies along a circumferential direction of the closed loop. The loop may be a segment of a cone or a similar three-dimensional object. The base of the loop need not to be circular, it may also be elliptical. For example, the projection of the loop along the cavity axis 15 may define the base. The diameter varies along the first direction. For example, the diameter may vary in a monotonic manner, e.g. the diameter may increase only without decreasing or the diameter may decrease only without increasing. For example, the diameter may gradually increase or decrease from a first diameter d1 to the second diameter d2. For example, the first circumference may correspond to a circumference of the loop having the first diameter d1. Further, the second circumference may correspond to a circumference of the loop having the second diameter d2. When the base of the loop is elliptical, the largest first diameter d1 may be different from the largest second diameter d2. According to a further embodiment, the first diameter d1 and the second diameter d2 may be measured along one direction.

Accordingly, the loop has an asymmetric shape with respect to a plane perpendicular to the first direction, e.g. the y-z-plane. The loop may be symmetric with respect to a plane including or spanned by the cavity axis 15.

The material of the waveguiding element may be any material that is commonly used as a waveguiding material, e.g. for visible light in a wavelength range of e.g. 380 to 780 nm. For example, the material may be transparent for incident light and may have an effective refractive index larger than an effective refractive index of a medium adjacent to the waveguiding element. The material may comprise an $SiO_2$ or polymer material. A thickness may be smaller than a wavelength of the light guided by the waveguiding element. For example, the thickness may be 50 to 300 nm, e.g. 70 to 150 nm, e.g. 80 to 120 nm. The waveguiding element implements a microcavity of the WGM-type (whispering gallery mode). In such a cavity, optical WGM-type resonances are established via optical self-interferences along a closed-loop trajectory guided by the cylindrical cavity wall. According to further embodiments, depending on a wavelength of light irradiated into the asymmetric optical resonator, different materials may be used for the waveguiding element. The material may have the properties as described above which may be adapted to the used wavelength range and/or an adjacent medium.

As is indicated in FIG. 1A, an incoming light beam 20 may be input into the asymmetric optical resonator and an output light beam 21 may be output from the asymmetric optical resonator. According to embodiments, laser light may be introduced into the asymmetric optical resonator, either via an input waveguide (not shown in FIG. 1A) or directly. According to further embodiments, luminescent centers may be integrated in the waveguiding element and may be excited by the input light. According to further embodiments, the asymmetric optical resonator may simply guide input light without amplification, i.e. without generating further light. In the waveguiding element 13 forming the asymmetric optical resonator, due to the sub-wavelength-thin cavity wall, photons linearly polarized along the cavity wall are allowed to circulate around a closed trajectory 25 within the microcavity as is, for example, illustrated in the upper portion of FIG. 1B. The photons circulating along the closed trajectory 25 eventually escape from the microcavity as output light 21.

The effective refractive index of the waveguiding element varies along the circumferential direction. Due to the locally varying refractive index, the propagating light is deflected from a hypothetical trajectory 26 which is perpendicular to the cavity axis 15. In more detail, the light propagates at an angle that is slanted with respect to the trajectory 26. For example, the trajectory of light may be curved, as follows from Fermat's principle. This is illustrated in more detail in FIG. 1B. Accordingly, due to the cone-shape of the cavity in combination with the locally varying effective refractive index, the electric field vector of the light rotates around the cavity axis 15 (x axis), as is indicated by arrows in FIGS. 1A and 1B. As a consequence, an effective orbital angular momentum is generated. The effective orbital angular momentum causes a spin-orbit coupling with the spin of the photons. As a result, each of the photons acquires an additional geometric phase with opposite signs, depending on whether the spin is up or down (e.g. the photon is right or left circularly polarized). This geometric phase is induced by the spin-orbit coupling and also referred to as Berry phase. Due to this additional geometric phase, the polarization state of the incident light is changed.

According to an embodiment, the waveguiding element 13 comprises a first portion of a first material and a second portion of a second material, the first material and the second material having different effective refractive indices, respectively. Thereby, a variation of the effective refractive index along a circumferential direction may be achieved.

According to a further embodiment, a thickness of the waveguiding element 13 may be varied along the circumferential direction, the thickness being measured in a direction perpendicular to the cavity axis, thereby varying the effective refractive index.

FIG. 1A further shows a device 28 for measuring or evaluating the polarization state of the output light. For example, device 28 may exploit the changed polarization state of the light, e.g. device 28 may be a device utilizing elliptically or circularly polarized light, for example, a sensor. According to an embodiment, device 28 may measure the polarization state of the output light. For example, device 28 may comprise a $\lambda/2$ plate that rotates the polarization orientation and a polarizer to determine the polarization state of the output light.

Figure 1B:
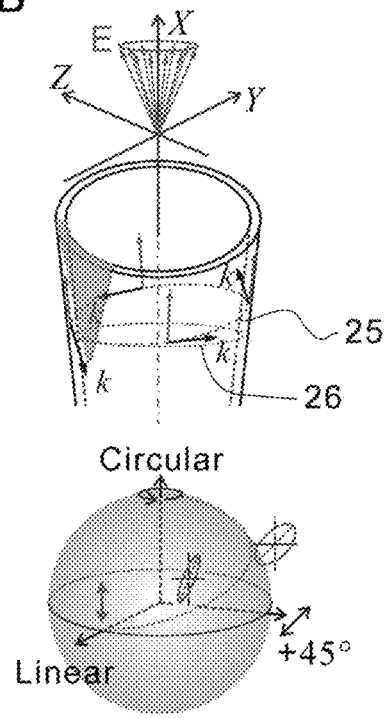
FIG. 1B depicts a trajectory of photons across the waveguiding element of FIG. 1A.
Figure 1C:
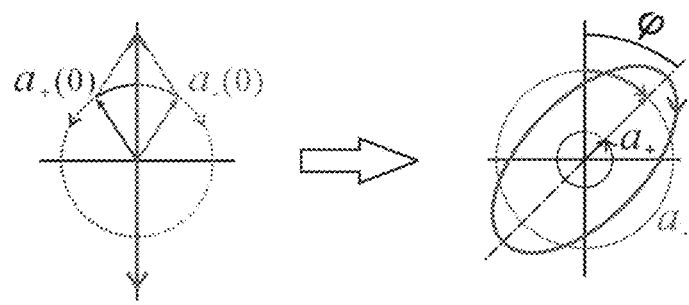
FIG. 1C illustrates different polarization states.

FIG. 1C schematically illustrates the effect of the asymmetric optical resonator illustrated in FIG. 1A. Generally, depending on the sign of the spin of a photon, a photon is a right circularly polarized photon or a left circularly polarized photon. Linearly polarized light may be regarded as a superposition of right and left circularly polarized light components with the same amplitude being superimposed in-phase. Elliptically polarized light may be regarded as a superposition of right and left circularly polarized light with different amplitudes, as shown in FIG. 1C. Initially, the incident light, e.g. linearly polarized, may be regarded as a superposition $a(0)=a_+(0)+a_-(0)$, with the same probability amplitude $|a_+(0)=a_-(0)|^2=1/2$. Due to the spin-orbit coupling in the asymmetric photonic device (optical resonator), a mode conversion between $a_+$ and $a_-$ may take place in addition to the occurrence of Berry phase, so that the superposition of both redistributed circularly polarized components results in an elliptical polarization state, as is indicated in the right-hand portion of FIG. 1C. The mode conversion may be caused by optical spin-orbit coupling in an anisotropic medium of the waveguide 13. As a result, one of the components is enhanced, and the other may be weakened.

The lower portion of FIG. 1B illustrates a Poincaré sphere which shows at its equator linearly polarized light which changes its polarization direction along the equator. The poles of the sphere correspond to circularly polarized light having different directions of rotation. When light travels on the trajectory 25 illustrated in the upper portion of FIG. 1B, it undergoes spin-orbit coupling during optical resonance in the cavity. The lower portion of FIG. 1B shows how the polarization state of the light changes in the course of this trajectory from linearly polarized light to elliptically polarized light. The angle φ shown in the right-hand portion of FIG. 1C represents the geometric phase acquired for the resonant light.

In summary, as has been explained above, when linearly polarized light enters the asymmetric optical resonator, the output light will be elliptically polarized due to the spin-orbit coupling. In a corresponding manner, the polarization state of any input light will be changed.

Figure 2A:
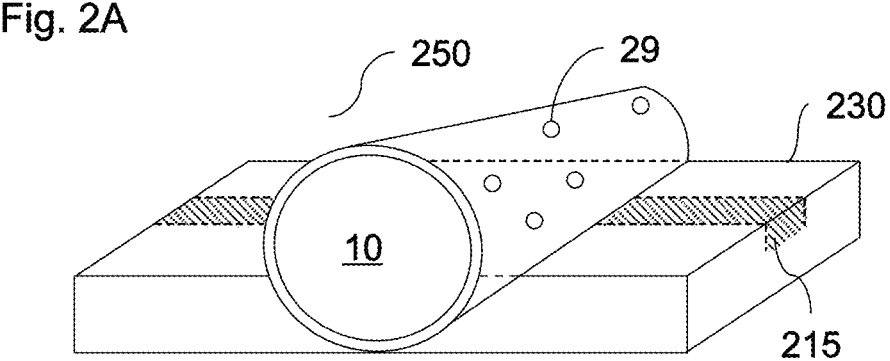
FIG. 2A shows a perspective view of an optical device according to an embodiment.

The asymmetric optical resonator 10 may be integrated with further optical components. For example, FIG. 2A shows an example of an optical device 250 comprising a substrate 230 on which the asymmetric optical resonator 10 is mounted. A waveguide structure 215 is disposed in the substrate 230. For example, the substrate may be silicon material or a metallic material, and the waveguide 215 may comprise silicon dioxide. For example, the substrate may be an SOI (silicon-on-insulator) or a silicon substrate, which has been accordingly patterned to form the waveguide structure 215 in the substrate. As is to be clearly understood, the substrate 230 may be any other substrate suitable for optical devices. The resonator 10 may be mounted to the substrate 230. For example, as is illustrated in FIG. 2A, according to an embodiment, the cavity axis 15 may be parallel to the substrate surface. FIG. 2A further shows luminescent centers 29, e.g. dopants introduced in the walls of the waveguiding element 13. The luminescent centers 29 may emit light, e.g. when being irradiated with laser light. According to a further embodiment, light emission may be caused by applying a suitable electric field or current.

Figure 2B:
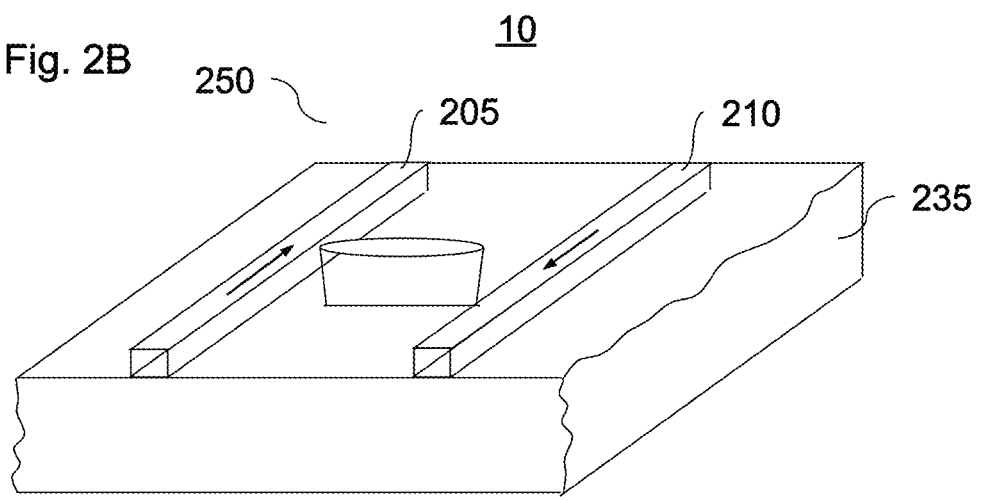
FIG. 2B shows a schematic perspective view of an optical device according to a further embodiment.

FIG. 2B shows a further embodiment of an optical device. Two waveguides 205, 210 may be formed on a suitable substrate 235. For example, the substrate 235 may comprise any of the materials which are commonly used for forming a substrate of an optical device. The waveguides 205, 210 may be correspondingly patterned stripes of a suitable waveguide material, for example, silicon dioxide. For example, the waveguide 205 may guide the input light and the waveguide 210 may guide the output light. The asymmetric optical resonator 10 may be mounted so that the cavity axis is perpendicular to surface of the substrate 235.

Figure 3A:
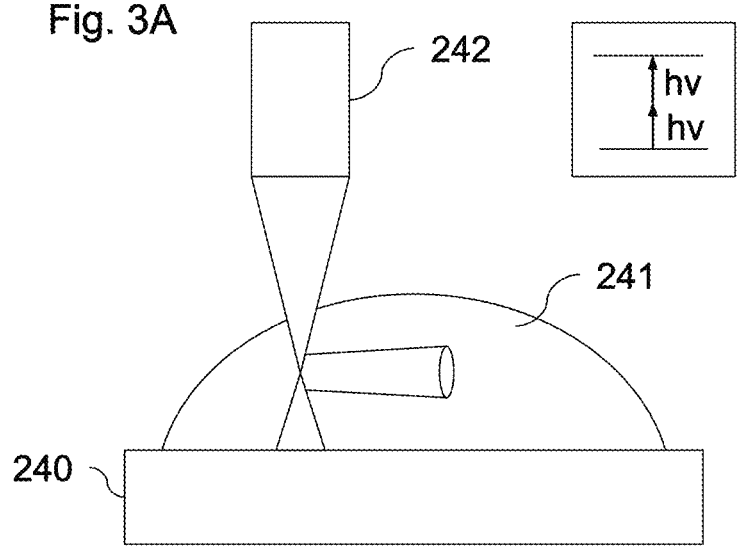
FIGS. 3A and 3B illustrate a method of manufacturing an asymmetric optical resonator.
Figure 3B:
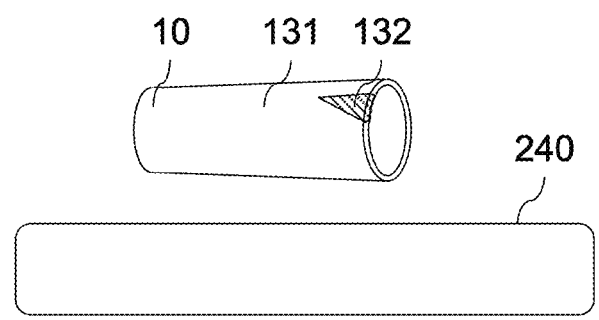

According to an embodiment, the asymmetric optical resonator may be manufactured using three-dimensional patterning/printing or forming methods. For example, the asymmetric optical resonator may be formed by a direct laser writing method which is based on two-photon induced photopolymerization of a suitable resist material 241 using a suitable laser 242 emitting ultrashort pulses (e.g. approximately 100 fs pulse duration). FIGS. 3A and 3B illustrate a method of manufacturing the asymmetric optical resonator according to this embodiment. According to two-photon induced photopolymerization, the resist material 241 is changed due to excitation upon absorption of two photons. One of the photons has been reflected by the substrate 240, the other of the photons is directly incident in the resist material. The two-photon induced photopolymerization may take place in a defined focal spot volume (voxel) in the resist material 241. The scan (writing) of the focal spot along a designed trajectory results in the formation of a desired structure embedded in the resist 241. The wavelength of the light emitted by the laser 242 may be selected in accordance with the resist material 241. For example, the wavelength may be in the near-infrared, e.g. 780 nm. After washing away the unexposed resist material in a suitable developer, the manufactured asymmetric optical resonator remains on the substrate. For example, the resist material may be SU-8, Ormocomp® or IP resists by Nanoscribe, e.g. IP-Dip, IP-L 780, IP-G 780 or IP-S. The developer may be selected to remove the unexposed material while maintaining the exposed material. For example, the asymmetric optical resonator may be formed so as to have a varying thickness resulting in a varying effective refractive index. According to an embodiment, this effect may be enhanced by forming a dielectric layer on the cavity surface to enhance an effective refractive index contrast between different portions of the asymmetric optical resonator. For example, this dielectric layer may be formed by atomic layer deposition (ALD). The resist material 241 may be selected so as to provide a desired refractive index. As a result, as is shown in FIG. 3B, an asymmetric optical resonator 10 is manufactured. The asymmetric optical resonator has a first portion 132 of the first effective refractive index and a second portion 131 of the second effective refractive index.

According to a further embodiment, the asymmetric optical resonator may be formed by 3-D printing. For example, suitable materials comprising silicon dioxide or polymer materials may be used for forming the asymmetric optical resonator. By choosing appropriate material combinations, the effective indices at the circumferential direction of the asymmetric optical resonator may be set. According to an embodiment, the asymmetric optical resonator may be formed to have a varying thickness at the circumferential direction resulting in a varying effective refractive index.

For example, the asymmetric optical resonator may have a diameter of approximately 1 to 300 μm. The wall thickness may be approximately 50 to 300 nm, e.g. 70 to 150 nm, e.g. 80 to 120 nm. The resonator length may be 10 to 100 μm, e.g. 20 to 90 μm, e.g. 40 to 50 μm. For example, a smallest diameter of the resonator may be 1 to 5 μm and the largest diameter may be 100 to 300 μm. As is clearly to be understood, these values are merely given as examples, and the person skilled in the art will be aware of further appropriate values that may be taken.

Figure 4A:
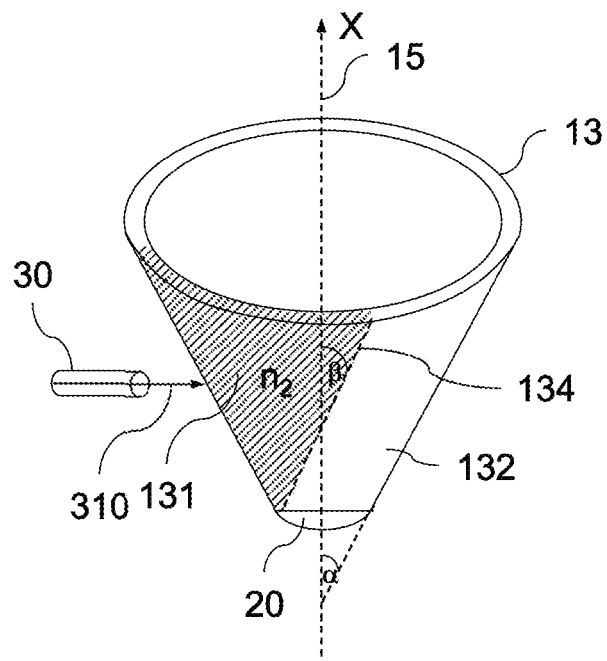
FIG. 4A shows further elements of the asymmetric optical resonator.

FIG. 4A shows a schematic view of an asymmetric optical resonator according to an embodiment. As is shown, the asymmetric optical resonator has a cone-like shape having an increasing diameter. For example, the diameter may increase at a fixed slope. According to a further embodiment, the diameter may increase at a varying slope. The cone-like shape may be characterized by an opening angle α of the sidewall of the waveguiding element 13 with respect to the cavity axis 15. According to an implementation, the waveguiding element 13 comprises a first portion 132 having a first effective refractive index n1. Moreover, the waveguiding element 13 comprises a second portion 131 having a second effective refractive index n2. Reference numeral 134 denotes a boundary between the first portion 132 having the first refractive index n1 and the second portion 131 having the second refractive index n2. The boundary 134 encloses an angle β with respect to the cavity axis 15. For example, the angle β may be different from 0°. By changing the angle α and/or the angle β, the polarization state of output light may be changed. In more detail, by changing the angle α, the amount of spin-orbit coupling and, hence, the phase shift between the two circularly polarized light components may be set. By changing the angle β, the tilt of the trajectory of light with respect to a plane perpendicular to the first direction may be set. According to an embodiment, the boundary between the first portion 132 having the first effective refractive index n1 and the second portion 131 having the second effective refractive index n2 need not be a sharp boundary. For example, the effective refractive index may gradually change from a first value n1 to a second value n2. By way of example, this may be achieved by gradually varying the thickness of the waveguiding element 13.

FIG. 4A further shows a laser source 30, which may emit a laser beam 310 to the waveguiding element 13. The laser light 310 may induce further emission, in case the waveguiding element is doped with corresponding light emission centers. According to a further embodiment, the laser light 310 may be focused on the waveguiding element 13. According to an example, the laser may emit a wavelength of 532 nm and may be focused of an area of less than 1 μm2 on the waveguiding element. According to a further embodiment, the waveguiding element 13 is not doped with light emission centers. In this case, incident laser light may be guided by the waveguiding element 13 without amplification.

Figure 4B:
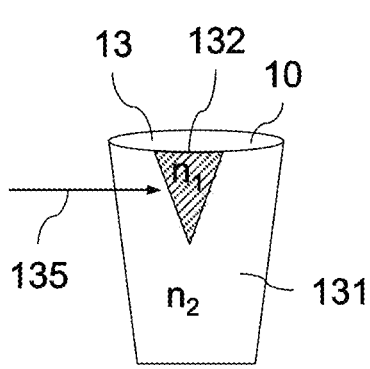
FIGS. 4B and 4C illustrate further embodiments of the asymmetric optical resonator.
Figure 4C:
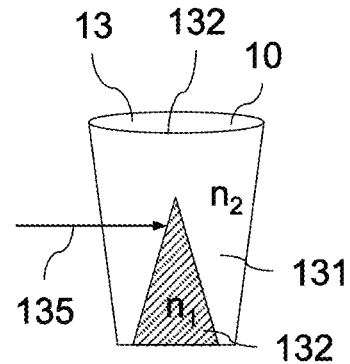

According to the embodiments illustrated in FIGS. 4B and 4C the first portion 132 having the first effective refractive index may have a triangular shape. For example, sides of the triangle may be slanted with respect to the cavity axis 15. The triangles may extend to the rim of the resonator or may not extend to the rim of the resonator 10. The first effective refractive index may be smaller or larger than the second effective refractive index. Instead of the triangular shape any suitable shape of the portion 132 having the first effective refractive index may be chosen. For example, the portion 132 may have a greater width at the top of the resonator 10 than at the bottom or vice versa. The width may be measured along the circumferential direction.

Figure 4D:
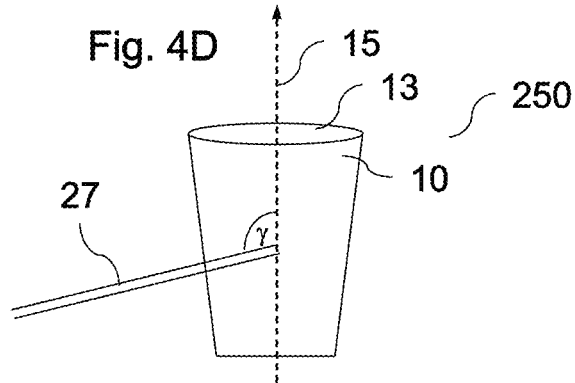
FIG. 4D illustrates an embodiment of an optical device.

FIG. 4D shows an embodiment of an optical device 250 comprising the asymmetric optical resonator 10 and a waveguide 27 for guiding light to the optical resonator 10. The waveguide 27 may be disposed at an angle y with respect to a cavity axis 15. The asymmetric optical resonator 10 may be implemented in the manner as has been described above.

FIG. 5 shows an example of an optical device 40 according to an embodiment. An input waveguide 400 is divided into n branches $410_1, \ldots 410_n$. The amount of light entering into each of the branches may be adjusted by correspondingly actuating the switches 4151, 4152, ... 415n. For example, the light input via the waveguide 400 may be linearly polarized, and the switches 4151, 4152, ... 415n may be polarization filters which may be switched on/off by setting an appropriate transmission angle. The optical device 40 further comprises a plurality of asymmetric optical resonators 4201, 4202, ... 420n, which may be implemented in the manner as has been discussed above. Any of the asymmetric optical resonators 4201, ... 420n may be designed to convert input light into a different polarization state. For example, this may be accomplished by setting the angle α and β as has been shown in FIG. 4A to different angles. Further, in the embodiments shown in FIGS. 4B and 4C the first portion 132 may be chosen so as to have a different shape and/or different width. Moreover, in the embodiment of FIG. 4D, the angle γ may be selected to have different values. Further, the position of the waveguide 27 along the cavity axis 15 may be changed.

When the asymmetric optical resonator is formed in the manner described with reference to FIGS. 3A and 3B, the parameters of the waveguide loop 13 such as thickness, diameter, "sub-parts" made of different materials etc. may be varied in order to provide different properties of the optical resonator. Accordingly, depending on which of the switches $415_1, \ldots 415_n$ is switched on or off, the output light may be set to a different polarization state. FIG. 5 further shows by way of example different polarization states $430_1, 430_2, \ldots 430_n$, which may be generated by the optical device. According to an embodiment, the components of the optical device 40 may be integrated into one substrate. For example, the waveguides may be formed in or on the substrate, the switches $415_1, \ldots 415_n$ may be formed in the substrate and the asymmetric optical resonators may be implemented in the manner as has been described above and may be disposed over the substrate. Accordingly, the optical device may generate different polarization states from an incident linearly polarized light beam. According to further embodiments, the incident light beam does not need to be necessarily linearly polarized. It may as well be in any appropriate polarization state.

Figure 6:
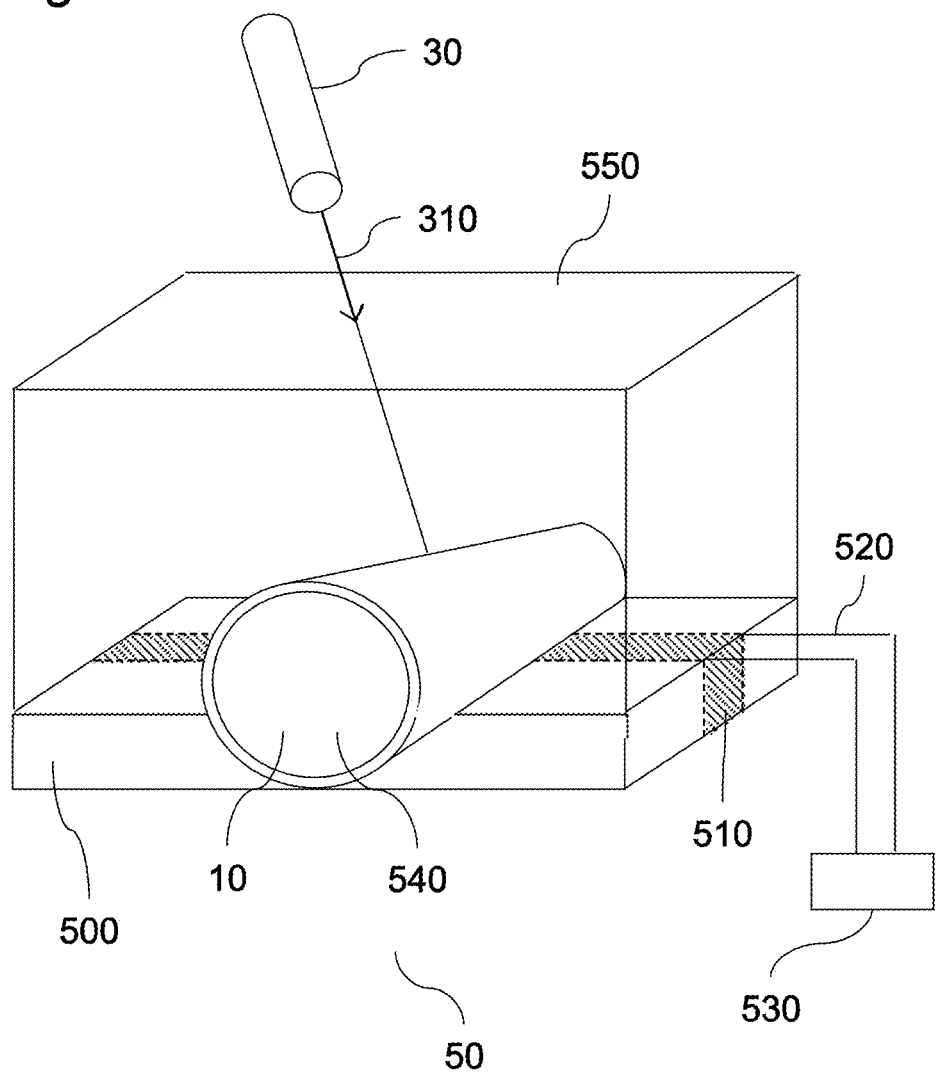
FIG. 6 shows an example of an optical sensor.

FIG. 6 shows an example of an optical sensor 50 comprising the asymmetric optical resonator 10 described herein before. As is shown, the asymmetric optical resonator 10 may be arranged on a substrate 500 and may be connected to a waveguide 510. The optical resonator 10 may be housed in a housing 550. Light 310 from an excitation light source 300, e.g. a laser light source, is employed to excite the optical sensor 50. As is shown, laser light 310 may be input without the use of a waveguide. The luminescent centers doped in the cavity will emit continuous light at a specified spectral band depending on the type of the luminescent centers. The light with its wavelength satisfying the resonance condition of the optical resonator will result in optical resonance within the cavity. The signal output from the optical sensor is sent to an analyzer 530 via the waveguide 510 and a further waveguide 520, or directly via far field emission. When filling or pumping in liquid 540 having different optical properties (refractive index etc.) into the optical resonator 10, the resonant light frequency/wavelength will shift to satisfy the resonance condition for the cavity containing liquid. By measuring the shift of the resonant peaks, the optical properties of the liquid to be examined may be analyzed. For example, the liquid may comprise chiral molecules. Depending on whether the molecules have the same chirality as the optical resonator the modes of the resonator are shifted or not, i.e. the peaks of absorption in the spectrum are shifted or not. In more detail, if the chirality of the resonator is opposite to that of the liquid to be examined, there is a large shift of the modes, whereas there is a small shift when the liquid to be examined and the resonator have the same chirality. The analyzer 530 may comprise a unit for comparing a calibration spectrum with a measured spectrum. For example, the calibration spectrum may have been taken in advance to measure the absorbance or photoluminescence without the fluid 540. From the comparison the analyzer 530 may assess properties of the fluid 540, e.g. the chirality.

Figure 7A:
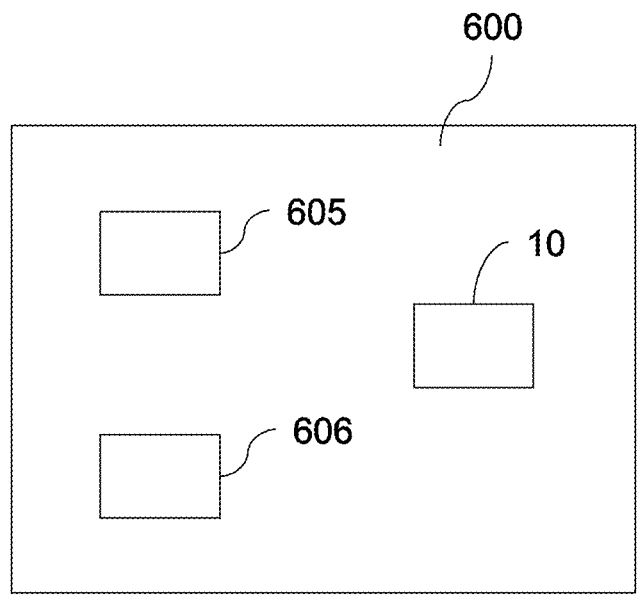
FIG. 7A shows a schematic view of a quantum computer.

FIG. 7A shows a schematic view of a quantum computer 600 comprising the asymmetric optical resonator 10 as has been described above. The quantum computer 600 comprises a light source 605, the optical resonator 10 and a suitable memory 606. The quantum computer shown in FIG. 7A mainly comprises components which are already known. Differing from the known components, the asymmetric optical resonator is capable of changing the polarization state of light. For example, a linearly polarized light beam carrying a qbit of $|\varphi\rangle = a|1\rangle + b|0\rangle$ may be input, wherein $a=1, b=0$. The light beam enters the optical resonator and the output beam carries a qbit of $|\varphi\rangle = a|1\rangle + b|0\rangle$, where $0<a<1$, $0<b<1$ and $a^2+b^2=1$. In this way, the qbit can be converted due to the spin-orbit coupling caused in the asymmetric optical resonator.

Figure 7B:
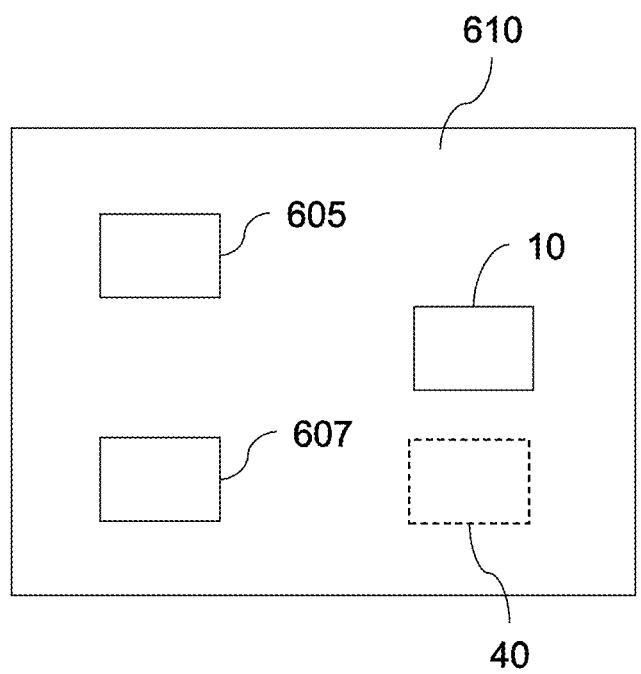
FIG. 7B shows a schematic view of a quantum communication device.

FIG. 7B shows an example of an optical communication device 610. The optical communication device 610 comprises a light source 605, the asymmetric optical resonator 10, which has been described above and an analyzer 607. In a similar manner as has been described above, the optical resonator may change the polarization state of light generated by the light source 605. Hence, information may be transmitted, using this changed polarization state. According to an embodiment, the optical communication device may comprise the optical device 40 which has been explained with reference to FIG. 5. Using such a device, depending on the state of the single switches $415_1, \ldots 415_n$, light output from the device 40 can be in a different polarization state, thus transmitting information. By correspondingly actuating the different switches $415_1, 415_2, \ldots 415_n$, the polarization state of the light may be modulated.

Further embodiments of the present application relate to the following:

Item 1. A quantum computer comprising an asymmetric optical resonator comprising a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

Item 2. A quantum communication device comprising an asymmetric optical resonator comprising a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

Item 3. Use of an asymmetric optical resonator for changing a polarization state of incident light, the asymmetric optical resonator comprising a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

Method 1. A method of changing a polarization state of light, comprising: inputting a linearly polarized light beam into an asymmetric optical resonator, the asymmetric optical resonator comprising a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

Method 2. The method according to method 1, wherein the light is input in a direction perpendicular to a cavity axis.

Method 3. The method according to method 1, wherein the light is input in a direction different from a perpendicular direction to the cavity axis.

While embodiments of the invention have been described above, it is obvious that further embodiments may be implemented. For example, further embodiments may comprise any subcombination of features recited in the claims or any subcombination of elements described in the examples given above. Accordingly, this spirit and scope of the appended claims should not be limited to the description of the embodiments contained herein.

What is claimed is:

1. An asymmetric optical resonator comprising:
   a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

2. The asymmetric optical resonator according to claim 1, wherein the waveguiding element comprises a first portion of a first material and a second portion of a second material, the first material and the second material having different effective refractive indices, respectively.

3. The asymmetric optical resonator according to claim 1, wherein a thickness of the waveguiding element varies along the circumferential direction, the thickness being measured in a direction perpendicular to the cavity axis, thereby varying the effective refractive index.

4. The asymmetric optical resonator according to claim 1, having a cone-like shape.

5. The asymmetric optical resonator according to claim 1, further comprising light emitting material integrated into the waveguiding element.

6. An optical device comprising an asymmetric optical resonator and a waveguide configured to couple light to the asymmetric optical resonator, the asymmetric optical resonator comprising:
   a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop.

7. The optical device according to claim 6, wherein the waveguide is configured to couple light at an angle different from 90° with respect to the cavity axis.

8. The optical device according to claim 6, further comprising a light source configured to emit a light beam entering the optical resonator.

9. An optical device according claim 6, wherein components of the optical device are integrated into a substrate to form an integrated optical device.

10. The optical device according to claim 9, wherein the waveguide is integrated in the substrate.

11. An optical sensor comprising an asymmetric optical resonator comprising a waveguiding element forming a closed loop, a first circumference of the loop being different from a second circumference, the first circumference being measured at one end of the loop in a plane perpendicular to a cavity axis, the second circumference being measured at the opposite end of the loop in a plane perpendicular to the cavity axis, wherein an effective refractive index of the waveguiding element varies along a circumferential direction of the loop, the optical sensor further comprising an analyzer for analyzing a transmission spectrum of the asymmetric optical resonator.

12. The optical sensor according to claim 11, wherein the waveguiding element comprises a first portion of a first material and a second portion of a second material, the first material and the second material having different effective refractive indices, respectively.

13. The optical sensor according to claim 11, wherein a thickness of the waveguiding element varies along the circumferential direction, the thickness being measured in a direction perpendicular to the cavity axis, thereby varying the effective refractive index.

14. The optical sensor according to claim 11, wherein the asymmetric optical resonator has a cone-like shape.

15. The optical sensor according to claim 11, further comprising light emitting material integrated into the waveguiding element.

* * * * *